United States Patent
Kar et al.

(10) Patent No.: US 12,124,911 B2
(45) Date of Patent: Oct. 22, 2024

(54) RFID ANTENNA DEVICE AND RFID SENSOR DEVICE

(71) Applicant: Balluff GmbH, Neuhausen a.d.F. (DE)

(72) Inventors: Debraj Kar, Stuttgart (DE); Matthias Hofherr, Karlsruhe (DE); Fabian Hauser, Plochingen (DE); Daniel Schweizer, Filderstadt (DE); Christoph Bauch, Stuttgart (DE); Marc Lechler, Simmozheim (DE); Thomas Graf, Blaubeuren (DE)

(73) Assignee: BALLUFF GMBH, Neuhausen ADF (DE)

( * ) Notice: Subject to any disclaimer, the term of this patent is extended or adjusted under 35 U.S.C. 154(b) by 201 days.

(21) Appl. No.: 18/078,375

(22) Filed: Dec. 9, 2022

(65) Prior Publication Data

US 2023/0186039 A1    Jun. 15, 2023

(30) Foreign Application Priority Data

Dec. 14, 2021 (DE) .......................... 102021132989.2

(51) Int. Cl.
    *G06K 7/10* (2006.01)
    *H01Q 1/22* (2006.01)

(52) U.S. Cl.
    CPC ....... *G06K 7/10316* (2013.01); *H01Q 1/2216* (2013.01)

(58) Field of Classification Search
    None
    See application file for complete search history.

(56) References Cited

U.S. PATENT DOCUMENTS

| 8,106,846 B2 * | 1/2012 | Kikin ....................... H01Q 7/00 |
| | | 343/895 |
| 2011/0018774 A1 * | 1/2011 | Kikin ................... H01Q 21/293 |
| | | 343/893 |
| 2023/0186039 A1 * | 6/2023 | Kar .......................... H01Q 1/42 |
| | | 340/10.1 |

FOREIGN PATENT DOCUMENTS

CN            203607541 U      5/2014

OTHER PUBLICATIONS

Zhang et al, "Broadband printed quadrifilar helix antenna using aprasitic strip technique", International Journal of RF and Microwave Computer-aided Engineering, , Publisher: Wiley 2017.
(Continued)

*Primary Examiner* — Carlos Garcia
(74) *Attorney, Agent, or Firm* — GableGotwals (57) ABSTRACT

An RFID antenna device (10) for emitting and/or receiving circularly polarised electromagnetic radiation, comprising a radiator unit (12) which has a radiator network (14) with multiple at least partially curved radiator portions (16) and an auxiliary antenna (20) which is galvanically isolated from the radiator network (14) and is inductively or capacitively coupled to the radiator network (14), a supply network unit (22) having a power division portion (26) with a device port and having at least one delay portion (28) which is electrically conductively connected to the power division portion (26) and is electrically conductively connected to the radiator portions (16), wherein the auxiliary antenna (20) is centrally located between the radiator portions (16). Further, an RFID sensor device comprising such an RFID antenna device (10).

17 Claims, 6 Drawing Sheets

(56) References Cited

OTHER PUBLICATIONS

Zhao et al, "Compact Uhf Frid handheld reader antenna and array based on resonant quadrifilar spiral structure", , pp. 139-146, vol. 69, Publisher: Progress in Electromagnetics Research C; 2016.

* cited by examiner

RFID ANTENNA DEVICE AND RFID SENSOR DEVICE

CROSS-REFERENCE TO RELATED APPLICATIONS

This United States application claims priority to German Patent Application No. DE 10 2021 132 989.2 filed 14 Dec. 2021, which is incorporated herein by reference.

The present invention relates to an RFID antenna device for emitting and/or receiving circularly polarised electromagnetic radiation. Furthermore, the present invention relates to an RFID sensor device comprising such an RFID antenna device.

PRIOR ART

Radio-frequency identification (RFID) technology is used in a variety of applications to automatically and contactlessly identify and locate objects by means of electromagnetic radiation which is emitted by an RFID sensor device, is reflected by a transponder provided on the object, and is received back by the RFID sensing device.

In the field of RFID technology, sensor devices are known that are distinguished by small sizes. These space-efficient sensor devices are only made possible by miniaturised antenna devices that are accommodated in a housing of the particular sensor device. In particular, this is the case in the UHF (Ultra High Frequency) RFID band, which is between 865 MHz and 960 MHz depending on the region.

In the prior art it is known to use purely circularly polarising patch antennas implemented in an RFID sensor device. However, the transmitting and receiving power of such miniaturised RFID sensor devices is greatly reduced. In particular, even the use of high-permittivity circuit board materials on which the patch antennas are mounted does not remedy the situation because, although such materials reduce the size, they lead to a reduction in RFID bandwidths and only narrow resonant frequency ranges. This also affects the quality of the circular polarisation and the impedance of the patch antennas, so that the axis ratio of the polarisation is not stable over the RFID bandwidth.

The scientific publication "Progress In Electromagnetics Research C, Vol. 69, 139-146, 2016" entitled "Compact UHF RFID Handheld Reader Antenna and Array Based on Resonant Quadrifilar Spiral Structure" by Xuefeng Zhao et al. describes a circularly polarised antenna based on a resonant quadrifilar spiral structure for the application of a UHF RFID handheld reader. When using a pure quadrifilar spiral antenna, the radiating power and the receiving power as well as the directivity are strongly affected due to the necessary miniaturisation of the antenna. Furthermore, the gain of the antenna is also reduced, and so there are limits to the miniaturisation.

In the scientific publication ZHANG, Yun-Qi [et al.]: Broadband printed quadrifilar helix antenna using parasitic strip technique, international journal of RF and microwave computer aided engineering, Vol. 28, 2018, No. 2, Article No. e21188 (9 S.), —ISSN 1099-047X, DOI: 10.1002/mmce.21188, a circular polarized (CP) printed quadrifilar helix antenna (QHA) with enhanced bandwidth is shown. This helix antenna is fed by a feeding structure having a Wilkinsion splitter. The feeding network can realise a 90° phase shift and four equal power divisions in a broad band range in a simple way. An enhanced impedance matching and CP radiation characteristic can be achieved with multiple parasitic strips between the helix arms.

DISCLOSURE OF THE INVENTION

One object of the present invention is to provide an RFID antenna device for emitting and/or receiving circularly polarised electromagnetic radiation, which has a stable directivity and uniform circular polarisation as well as an improved antenna gain over the widest possible RFID bandwidth with a simultaneously small size. A further object of the invention is to provide an RFID sensor device which has a standardised fastening option.

One of these objects is achieved by an RFID antenna device according to the invention for emitting and/or receiving circularly polarised electromagnetic radiation, comprising a radiator unit which has a radiator network with multiple at least partially curved radiator portions and at least one auxiliary antenna which is galvanically isolated from the radiator network and which is inductively or capacitively coupled to the radiator network. The RFID antenna device has a supply network unit which has a power sharing portion with a device port and which has at least one delay portion electrically conductively connected to the power sharing portion and electrically conductively connected to at least one radiator portion, wherein the auxiliary antenna is centrally located between the radiator portions.

The radiator unit with the radiator network and the auxiliary antenna form the part of the RFID antenna device that radiates and/or receives the electromagnetic radiation as a so-called aperture area. In the case of radiation of the electromagnetic radiation, an energy source connected to the supply network unit actively applies a wave signal in the form of an alternating voltage or alternating current to the radiator network. The radiation is radiated through the radiator portions, wherein the auxiliary antenna is excited by inductive or capacitive coupling for assistive radiation. In the event of radiation being received, the radiation is picked up by the auxiliary antennas and the radiator portions and passed on to an evaluation unit by the supply network unit. Both the energy source and the evaluation unit can be integrated in the same device, which can be connected to the device port of the supply network unit.

Curved radiator portions achieve a maximum aperture (active area) of the antenna and thus also a particularly good circular polarisation.

The power division portion ensures a balanced distribution of the energy carried by the electromagnetic radiation to the multiple radiator portions and the mutual impedance isolation of the radiator portions from each other. The delay portion controls the phase position of the electromagnetic radiation by delaying the wave signal applied to the radiator portions with regard to its phase with which it arrives at the radiator portions.

A galvanic isolation between two objects is distinguished by the absence of an electrical connection so that no direct electrical current can flow between the objects. By using an auxiliary antenna that is galvanically isolated from the radiator network and yet is inductively or capacitively coupled, the antenna gain and a circularly polarised polarisation of the RFID antenna device are improved compared to an antenna device without an auxiliary antenna. These improvements are ensured over the entire RFID bandwidth, moreover with simultaneously small sizes of the RFID antenna device. The size of the aperture area can be significantly below the usual dimensions of $\lambda/2$ for antennas, wherein $\lambda$ is the wavelength of the emitted and/or received electromagnetic radiation. For example, the dimension of the RFID antenna device or the radiator unit along at least one axis can be $\lambda/15$. Converted, the dimension may be between 20 mm and 30 mm. The miniaturisation freedoms obtained by the auxiliary antenna inductively or capacitively coupled to the radiator network open up the possibility of installing the RFID antenna device in a space-efficient housing of an RFID sensor device.

The wavelength $\lambda$ is calculated depending on the RFID band and can have a value of 340 mm.

The RFID bands are usually within the following ranges:

| | |
|---|---|
| ETSI frequency band | 865 MHz ... 868 MHz |
| FCC frequency band | 902 MHz ... 928 MHz |
| UNI frequency band | 860 MHz ... 960 MHz |

Alternative frequency bands are also conceivable that have the same order of magnitude.

Advantageous embodiments and developments of the invention are possible by the measures described in the dependent claims.

Advantageously, the radiator portions can have a connection end connected to the delay portion and a remote end, wherein the connection end is arranged closer to the auxiliary antenna than the remote end. In this way, the longest possible radiator portions can be realised in the radiator network in a space-saving manner. The remote end is distally spaced from the connection end.

The connection between the connection end and the adapter portion can be made by a solder joint. The solder joint defines the sub-portion of the radiator portions that interacts with the electromagnetic radiation. The position of the solder joint may serve as a design parameter of the RFID antenna device. Between the remote end and the connection end, the radiator portions may be partially curved.

It is preferred that the radiator network has four radiator portions, each connected to a single delay portion. The radiator portions may be formed at least in portions along a circumference of a circle. In this case, the radii of the radiator portions have the same centre as the auxiliary antenna positioned between the radiator portions. Further portions of the radiator portions can be arranged between the auxiliary antenna and an adjacent radiator portion, so that these further portions have a smaller distance from the centre than the portions on the circumference of the circle. Preferably, the radiator portions can be formed in a spiral shape starting from the auxiliary antenna. In particular, the connection end of a first radiator portion may be arranged between a second radiator portion and the auxiliary antenna. Four radiator portions can provide a circularly polarised antenna in which the axis ratio of the circularly polarised radiation is <2 dB.

It may further be provided that the auxiliary antenna has sides of equal length. By using such an advantageous auxiliary antenna, the supply losses can be reduced to −10 dB within the RFID band, in particular 865 to 868 MHz and 902 to 928 MHz.

In order for the radiator portions to have a length of half the wavelength $\lambda/2$ as far as possible, the radiator portions can have a meandering sub-portion and/or a sub-portion based on a fractal geometry. This makes it possible to reduce the size of the radiator unit while at the same time achieving a sufficiently high antenna gain.

In a particular embodiment, the radiator unit can be embodied as a circular radiator circuit board made of a dielectric, which has a diameter D that is smaller than half the wavelength $\lambda/2$ of the electromagnetic radiation, wherein the radiator network and the auxiliary antenna are arranged as conductor tracks on the radiator circuit board. In particular, despite a diameter of the radiator unit of $D=\lambda\backslash15$, an RFID bandwidth of $>\frac{1}{30}$ of the centre frequency attenuated by 3 dB can be achieved, although the diameter is significantly smaller than $\lambda\backslash2$.

The auxiliary antenna can be mounted on the radiator circuit board as a so-called parasitic patch antenna.

A preferred development can include the fact that a curved sub-portion of the radiator portions is arranged at a circumferential edge of the radiator circuit board. Preferably, the curved sub-portion extends only partially along the circumferential edge of the radiator circuit board. This achieves maximum utilisation of the surface area (maximization of the antenna aperture) of the radiator circuit board, so that a better antenna gain compared to conventional small antennas can be ensured by a geometric design of the radiator portions, more specifically without the use of circuit board material with high dielectric values. An aperture area is formed on the radiator circuit board and the radiator portions are arranged over the aperture area.

Preferably, the supply network unit can be set up to apply a wave signal to each delay portion, wherein each wave signal of a delay portion has a phase shift of 90° to at least one other of the wave signals of a further delay portion. In particular, the wave signals of the individual delay portions can each have a value from the group of values 0°, 90°, 180°, 270°.

It is preferred that the power division portion has a Wilkinson power divider connected to the at least one delay portion. The Wilkinson power divider achieves good power efficiency because it has only low line losses and also high impedance isolation of the arms from each other.

It is particularly preferred that the supply network unit is formed as a circular supply circuit board made of a dielectric, wherein the supply network unit and the delay portion are arranged as conductor tracks on the supply circuit board. The dielectric constant of the circuit board material may be around 10, for example. The supply circuit board may have a diameter D of 24 mm for a frequency of 865 MHz in particular.

An adapter unit may be disposed between the radiator unit and the supply network unit, the adapter unit having at least one compensating portion provided for impedance compensation and at least one supply line provided for electrically conductively connecting the delay portion to a radiator portion. The adapter unit serves to compensate for the reactance of the RFID antenna device which is caused by the large size reduction of the radiator unit and affects the impedance, and to provide additional resonator line length of the arms. The adapter unit does not radiate power as it is not part of the aperture area of the radiator unit.

The compensation portion can be achieved by at least one discrete component and/or by a stub that is connected to a ground connection of the supply network unit. Alternatively, a stub with an open end is also conceivable. If stubs are used, the RFID antenna device can be optimised for the ETSI, FCC and UNI bands by simply adapting the stubs and the length of the radiator portions.

It may be provided that the adapter unit has at least one adapter circuit board on which the compensation portion and/or the supply line are arranged as conductor tracks. In the case of a stub as a compensating portion, the stub may be significantly shorter than the circuit board dimensions in its main plane of extent. The circuit board material may include FR4. Other circuit board materials are also conceivable.

In particular, two adapter circuit boards that are oriented transversely to each other can be connected to each other, for example by being plugged into each other and/or glued together. Preferably, the circuit boards are oriented perpendicularly to each other. This saves space compared to a conventional arrangement.

If the at least one adapter circuit board is oriented on edge between the radiator unit and the supply unit, wherein the radiator circuit board and the supply circuit board are oriented perpendicularly to the adapter circuit board, the radiator circuit board and the supply circuit board are spaced parallel to each other. However, a stub may be significantly shorter than the distance between the radiator circuit board and the supply circuit board.

The further object is achieved by an RFID sensor device comprising the RFID antenna device. The RFID sensor device has a sleeve-shaped housing with a receiving cavity in which the RFID antenna device and the associated evaluation electronics are arranged. Due to the small design of the RFID antenna device, a small, in particular largely standardised housing can be used, so that installation space and weight can be saved. In addition to sleeve-shaped housings, other housing shapes can also be used that fulfil the purpose of enclosing the RFID antenna device in an equivalent manner.

It is particularly preferred to provide the housing with an external thread and/or to form the receiving cavity cylindrically, the latter having a diameter of $1/15$ of the wavelength $\lambda$ of the emitted and/or received circularly polarised electromagnetic radiation. This allows the very small and light RFID sensor device to be used in a wide range of different types of machines without any problems.

It is understood that the features mentioned above and yet to be explained below can be used not only in the particular combination indicated, but also in other combinations.

In particular, the features regarding the different circuit board materials can be combined with each other. Furthermore, it is also possible to deviate from the circular shape of the circuit boards and to use an angular and/or oval or other shape, wherein each of these shapes can be combined with the other features.

BRIEF DESCRIPTION OF THE DRAWINGS

Exemplary embodiments of the invention are shown in the drawings and will be explained in more detail in the following description.

EXEMPLARY EMBODIMENTS OF THE INVENTION

Figure 1:
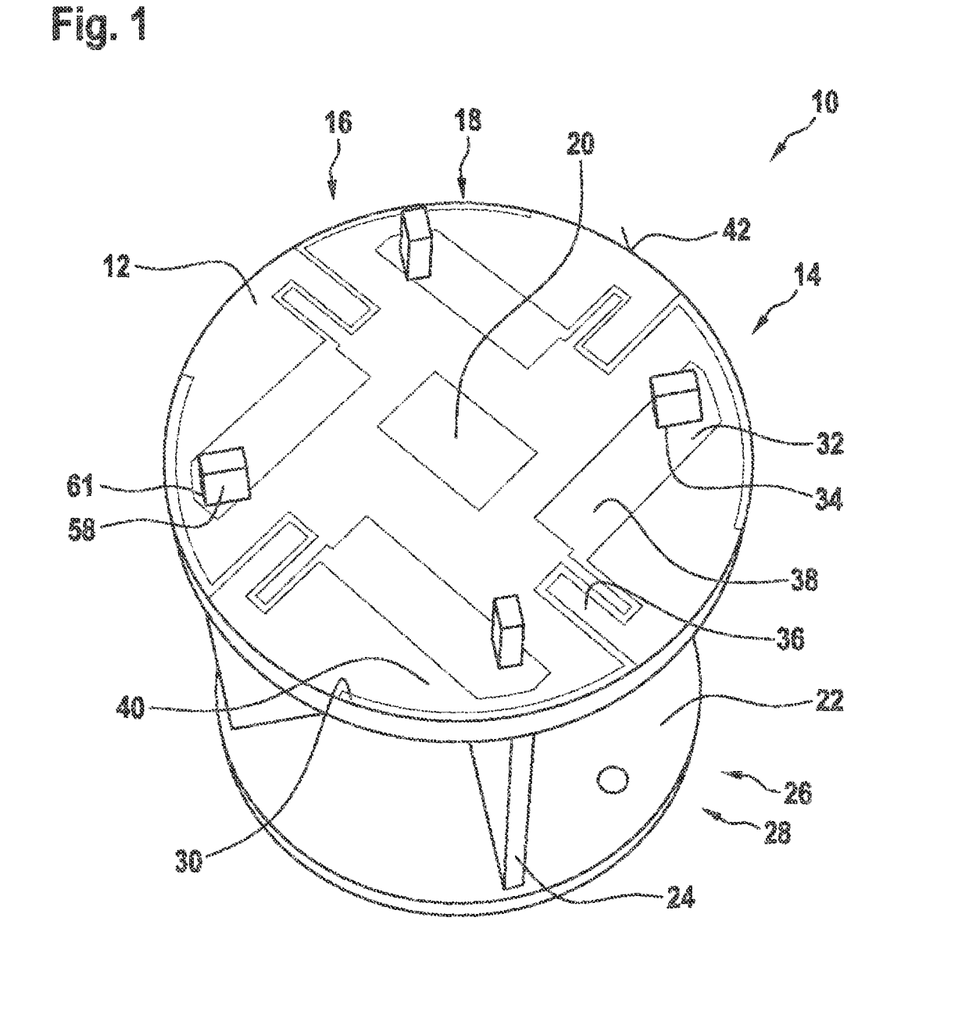
FIG. 1 shows an RFID antenna device with a radiator unit, a supply network unit and, arranged in-between, an adapter unit according to an exemplary embodiment of the invention.

An exemplary embodiment of the RFID antenna device 10 according to the invention is shown in FIG. 1. The RFID antenna device 10 is intended for emitting and/or receiving circularly polarised electromagnetic radiation. For this purpose, the RFID antenna device 10 comprises a radiator unit 12 having a radiator network 14 with four partially curved radiator portions 16. The radiator portions 16 each have a curved sub-portion 18, which preferably does not occupy the entire radiator portion 16. The curved radiator portions 16 allow for improved circular polarisation of the antenna compared to radiator portions that are not curved.

Furthermore, the radiator unit 16 comprises an auxiliary antenna 20 which is galvanically isolated from the radiator network 14 and which is inductively or capacitively coupled to the radiator network 14. A galvanic separation between two objects is distinguished by the absence of an electrical connection, so that no electrical current can flow between the objects. Accordingly, the radiator network 14 and the auxiliary antenna 20 are electrically separated from each other in such a way that no electrical current can flow between the radiator network 14 and the auxiliary antenna 20. There is only an electromagnetic inductive or capacitive coupling between the radiator network 14 and the auxiliary antenna 20. The galvanic isolation is achieved by spacing the radiator network 14 and the auxiliary antenna 20 apart from each other. The radiator unit 12 with the radiator network 14 and the auxiliary antenna 20 form the part of the RFID antenna device 10 emitting and/or receiving the circularly polarised electromagnetic radiation.

The RFID antenna device 10 additionally comprises a supply network unit 22 having an electrical device port. The device port can be connected to an energy source and/or to an evaluation unit.

In one mode of operation of the RFID antenna device 10 as a radiating antenna, the connected energy source applies a wave signal in the form of an alternating voltage or an alternating current to the radiator network 14 via the supply network unit 22. The energy thus fed in is radiated in the form of circularly polarised radiation through the radiator portions, wherein the auxiliary antenna 20 is excited by inductive or capacitive coupling for assistive radiation.

When the RFID antenna device 10 is used as a receiver for electromagnetic radiation, the radiation is picked up by the auxiliary antennas 20 and the at least one radiator portion 16 and is forwarded to the evaluation unit by the supply network unit 22.

The wavelengths at which the RFID antenna device 10 is operated are in the RFID bands having the following RFID bandwidths:

| ETSI frequency band | 865 MHz . . . 868 MHz |
| FCC frequency band | 902 MHz . . . 928 MHz |
| UNI frequency band | 860 MHz . . . 960 MHz |

Alternative frequency bands are also conceivable that have the same order of magnitude.

By using an auxiliary antenna 20, a good antenna gain is ensured over the entire RFID bandwidth. At the same time, a small size of the RFID antenna device 10 is realised. Here, the overall size is clearly below the dimensions of $\lambda/2$, wherein λ is the wavelength of the transmitted and/or received electromagnetic radiation.

The RFID antenna device 10 additionally also has an adapter unit 24 arranged between the supply network unit 22 and the radiator unit 14. The adapter unit 24 serves to compensate for the reactance of the RFID antenna device caused by the large size reduction of the radiator unit 12 and affecting the impedance.

Such an RFID antenna device 10 according to the invention has the following measured values for the ETSI frequency band at a frequency of 868 MHz:

| Measuring frequency [MHz] | 868 |
|---|---|
| Gain [dBic] | −6.1 |
| Gain [dBi] vertical | −9.1 |
| Gain [dBi] horizontal | −9.1 |
| 3 dB beam angle [°] | 134 |
| Front/rear side ratio [dB] | 3.6 |
| Max/min ratio [dB] | 9.2 |
| Axis ratio [dB] | 0.0 |

For the FCC frequency band, the RFID antenna device 10 has the following measured values at frequencies of 902 MHz, 915 MHz and 928 MHz:

| Measuring frequency [MHz] | 902 | 915 | 928 |
|---|---|---|---|
| Gain [dBic] | −7.3 | −8.5 | −10.1 |
| Gain [dBi] vertical | −10.6 | −10.9 | −12.78 |
| Gain [dBi] horizontal | −10.0 | −12.2 | −13.5 |
| 3 dB beam angle [°] | 156 | 143 | 144 |
| Front/rear side ratio [dB] | 6.8 | 6.5 | 1.9 |
| Max/min ratio [dB] | 8.3 | 7.6 | 7.2 |
| Axis ratio [dB] | 0.6 | 1.3 | 0.8 |

The supply network unit 22 has a power division portion 26 which is formed as the Wilkinson power divider and has the device port. The power division portion 26 distributes the power of the energy carried by the electromagnetic radiation to the four radiator portions 16. Through the power division portion 26, each radiator portion 16 is supplied with energy evenly.

Furthermore, the supply network unit 22 includes two delay portions 28 that adjust the phase position of the electromagnetic radiation by delaying the wave signal that is applied to the particular radiator portion 16 with regard to its phase with which the wave signal arrives at the radiator portion 16. Each radiator portion 16 is supplied with a wave signal that has a different phase position. The delay portion 28 is electrically conductively connected to the power division portion 26.

Each of the four radiator portions 16 has a remote end 30 which is free. In addition, each radiator portion 16 has a connection end 32 that is electrically conductively connected to the associated delay portion 28 by a solder joint 34. The active portion of the radiator portion 16 with respect to the receipt and emission of electromagnetic radiation begins at the solder joint 34 and extends to the remote end 30. The remote end 30 is spaced apart here from the connection end 32.

The connection end 32 is located closer to the auxiliary antenna 20 than the remote end 30, but the connection end 32 is nevertheless electrically insulated from the auxiliary antenna 20.

Between the remote end 30 and the connection end 32, the radiator portion 16 is partially curved. This creates a radiator portion 16 that runs radially outwards starting from the region of the auxiliary antenna 20. The radiator portions 16 are shaped identically to each other, wherein they are arranged point-symmetrically with respect to the auxiliary antenna 20. The radiator portions 16 are spirally shaped starting from the auxiliary antenna 20. All distant ends 30 point in the same circumferential direction.

The connection end 32 of a first radiator portion 16 is positioned between an adjacent second radiator portion 16 and the auxiliary antenna 20. The connection ends 32 and the remote ends 30 of a radiator portion 16 are positioned on opposite sides of the auxiliary antenna 20. The auxiliary antenna 20 is arranged here centrally between the radiator portions 16.

The auxiliary antenna 20 has sides of equal length in a square arrangement.

The radiator portions 16 have differently shaped sub-portions. According to FIG. 1, the curved sub-portion 18 has the remote end 30 and merges into a meandering sub-portion 36. Here, the individual loops of the meandering sub-portion 36 can be of different sizes. A base portion 38 of the radiator portion 16 has the connection end 32 and is connected to the meandering sub-portion 36. In this regard, the base portion 38 may be significantly wider than the remainder of the radiator portion 16. An edge of the particular base portion 38 is formed parallel to at least one edge of the auxiliary antenna 20. For example, the base portions are each formed parallel to the nearest edge of the auxiliary antenna 20.

The exemplary radiator unit from FIG. 1 is embodied as a circular radiator circuit board 40 made of a dielectric. The diameter D of the radiator circuit board 40 is smaller than half the wavelength $\lambda/2$ of the electromagnetic radiation. For example, the diameter D of the radiator unit 12 is even D=$\lambda$\15, whereby an RFID bandwidth attenuated by 3 dB of >$\frac{1}{30}$ of the particular centre frequency is achieved. This is preferably true for any frequency of the ETSI, FCC and/or UNI frequency band. For example, the diameter of the RFID antenna device 10 or of the radiator unit 12 is $\lambda/15$ and thus 23.5 mm.

Ceramic and/or polymeric materials are used as high-frequency circuit board materials, and in the example according to the embodiment have a dielectric constant between 2 and 4, but in particular between 3.3 and 3.5, if the RFID antenna device is to be operated in the ETSI band. If the RFID antenna device is to be operated in the FCC band, circuit board material is used that has a dielectric constant between 1 and 3, but in particular of 2.55 or 2.6. For example, circuit board material having the designation FR4, RO4535 and/or AD255C is used as the circuit board material. The radiator network 14 and the auxiliary antenna 20 are arranged as metal conductor tracks on the radiator circuit board 40. The auxiliary antenna 20 is arranged, for example, as a so-called parasitic patch antenna on the radiator circuit board 40.

According to FIG. 1, the curved sub-portion 18 of the radiator portion 16 is disposed along a circumferential edge 42 of the radiator circuit board 12. Here, the curved sub-portion 18 runs partially along the circumferential edge 42 of the radiator circuit board 12. Each curved sub-portion 18 extends along approximately one fifth of the circumferential edge 42 of the circumferential edge 42. The curved sub-portion 18 extends from the meandering sub-portion 36 of a directly adjacent radiator portion 16 along the circumferential edge 42 towards the connection end 32 of the directly adjacent radiator portion 16. The entire base portion 38 of the directly adjacent radiator portion 16 is hereby interposed between the curved sub-portion 18 and the auxiliary antenna 20.

Each delay portion is supplied with a wave signal which has a phase shift of 90° to at least one other of the wave signals of a further delay portion. The wave signals of the individual delay portions can, for example, have a phase shift of 0°, 90°, 180° or 270°.

Figure 2:
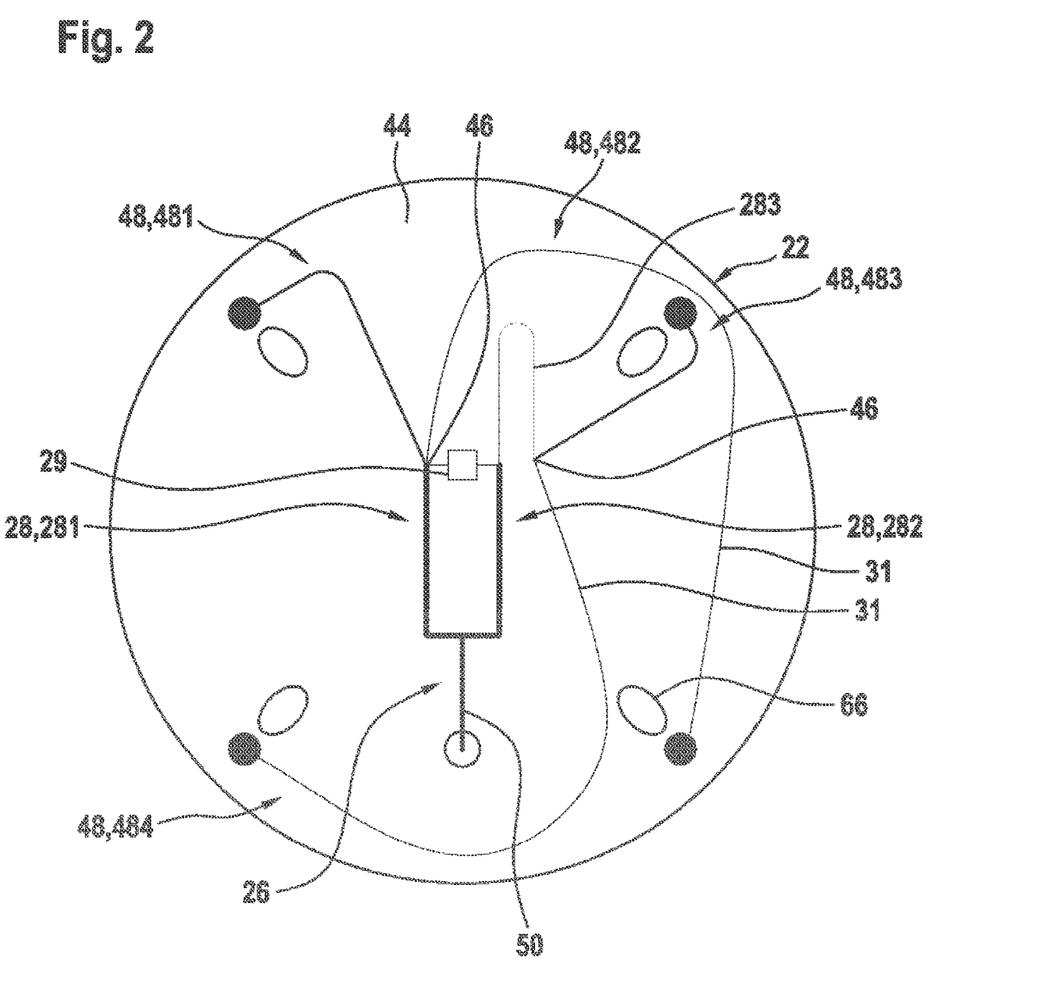
FIG. 2 shows a supply network unit with a Wilkinson power divider according to an exemplary embodiment of the invention.

In FIG. 2, the supply network unit 22 is shown, wherein the power division portion 26 is arranged on a circular supply circuit board 44. The power division portion 26, embodied as a Wilkinson power divider, is symmetrical. The power division portion 26 merges into two delay portions 28, which are formed as meandering conductor paths. Furthermore, starting from a resistor 29, the second delay portion 282 has an additional delay line 283 provided for a delay of 90°. The actual power division ends at the 100 ohm resistor 29. Each of the delay portions 28 has a bifurcation 46 of the conductor track on its end facing away from the energy division portion 26, so that two sub-portions 48 of the delay portions 28 are formed. The sub-portions 48 are of different lengths to each other, thereby creating an additional delay 31 to each other, and are thinner than the remaining delay portion 28 in question.

The circular supply circuit board 44 is made of a dielectric, wherein for example a circuit board material is used which has a dielectric constant of from 9 to 11, but in particular between 10.2 and 11.2, wherein the supply circuit board 44 includes so-called RO3010 and FR4. For example, the supply circuit board 44 has a diameter of 24 mm at a frequency of 865 MHz.

For example, the power division portion 26 may be embodied as a Wilkinson power divider having a 50 ohm device port 50 and two delay portions 28, each having a bifurcation 46 that transitions into two sub-portions 48.

The two delay portions 28 divide into a first delay portion 281 with a 50 ohm output and a second delay portion 282 with a 50 ohm output, but which due to its greater length causes a 90° phase shift of the wave signal transmitted to or from the radiator portions 16.

The first delay portion 281 has, after its bifurcation 46, a first and a second sub-portion 481, 482 which form an angle of 180° with each other on the supply circuit board. The first sub-portion 481 has an impedance of 100 ohms and no additional phase shift, i.e. a phase shift of 0°. The second sub-portion 482 also has an impedance of 100 ohms and an additional phase shift of 180°.

The second delay portion 282 has, after its bifurcation 46, a third and a fourth sub-portion 483, 484 which form an angle of 180° with each other on the supply circuit board. The third sub-portion 483 has an impedance of 100 ohms. The fourth sub-portion 484 also has an impedance of 100 ohms and an additional phase shift of 180°. Due to the delay line 283, the sub-portions 483 and 484 have an additional phase shift of 90° with respect to the sub-portions 481 and 482. The angle between the end points of the sub-portions 481 and 483 and the end points of the sub-portions 482 and 484 is 90° in each case.

Figure 3:
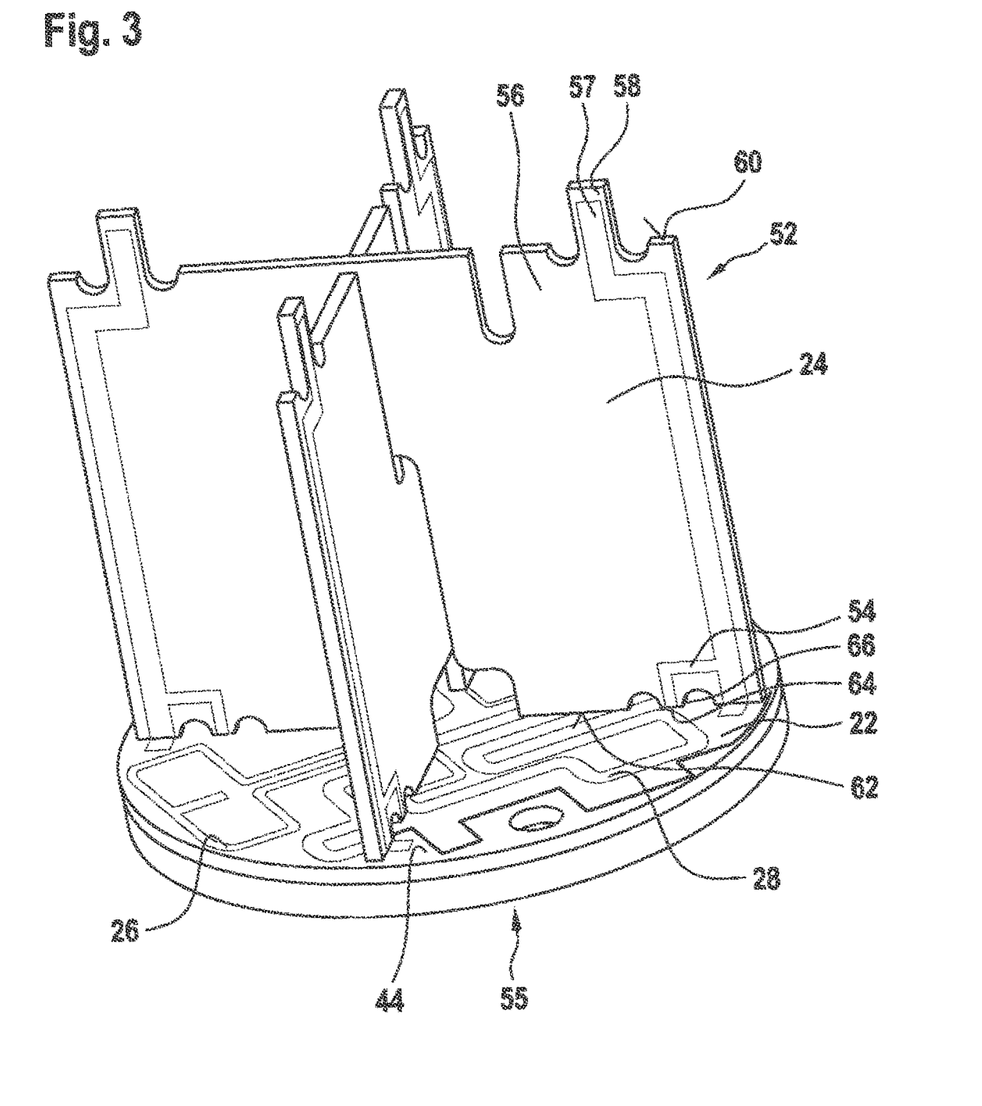
FIG. 3 shows an adapter unit formed from two crossed adapter circuit boards on a supply network unit according to an exemplary embodiment of the invention.

FIG. 3 shows an adapter unit 24 arranged on the supply network unit 22. The adapter unit 24 has a compensating portion 52 provided for impedance compensation, which adapts the reactance of the RFID antenna device 10 resulting from the large size reduction of the radiator unit 12. The compensation portion 52 is realised by way of example by a stub 54 in FIG. 3, which is connected to a ground connection 55 of the supply network unit 22. Alternatively or additionally, an open stub 54 and/or discrete electrical components may also be provided.

Further, the adapter unit 24 comprises at least one supply line 57 provided for electrically conductively connecting the delay portion 28 to the radiator portion 16.

The adapter unit 24 has at least one adapter circuit board 56 on which the compensation portion 52 and/or the supply line 57 are arranged as conductor tracks. In the case of an exemplary stub 54 as the compensating portion 52, the stub 54 is less than a λ/4. According to the exemplary embodiment, the circuit board material includes FR4.

The at least one adapter circuit board 56 is oriented perpendicularly with respect to the radiator circuit board 40 and the supply circuit board 44. The adapter circuit board 56 has, on the radiator side, at least one form-fit extension 58 which extends vertically from an end edge 60 facing the radiator circuit board 40. The form-fit extension 58 is used to connect the adapter circuit board 56 to the radiator circuit board 40 form-fittingly, in such a way that the form-fit extension 58 is inserted into a form-fit receptacle 61, as shown in FIG. 1, in the radiator circuit board 40. The form-fit receptacle 60 is formed in the base portion 38 of the radiator portion 16. A portion of the supply line 57 is disposed on the form-fit extension 58 and extends to the opposite supply-network-side end edge 62 of the adapter circuit board 56. A supply-network-side form-fit extension 64 extending vertically in the direction of the supply circuit board 44 originates at the supply-network-side end edge 62 and is intended for form-fitting connection to a form-fit receptacle 66 in the supply circuit board 44. The stub 54 is arranged on the supply-network-side form-fit extension 64.

When the form-fit extensions 58, 64 are inserted into the corresponding form-fit receptacles 60, 66, the adapter circuit board 56 is oriented perpendicular to the radiator circuit board 40 and the supply circuit board 44.

For example, two adapter circuit boards 56 oriented perpendicular to each other are plugged into each other. Each adapter circuit board 56 has two radiator-side and two supply-network-side form-fit extensions 58, 64.

Figure 4:
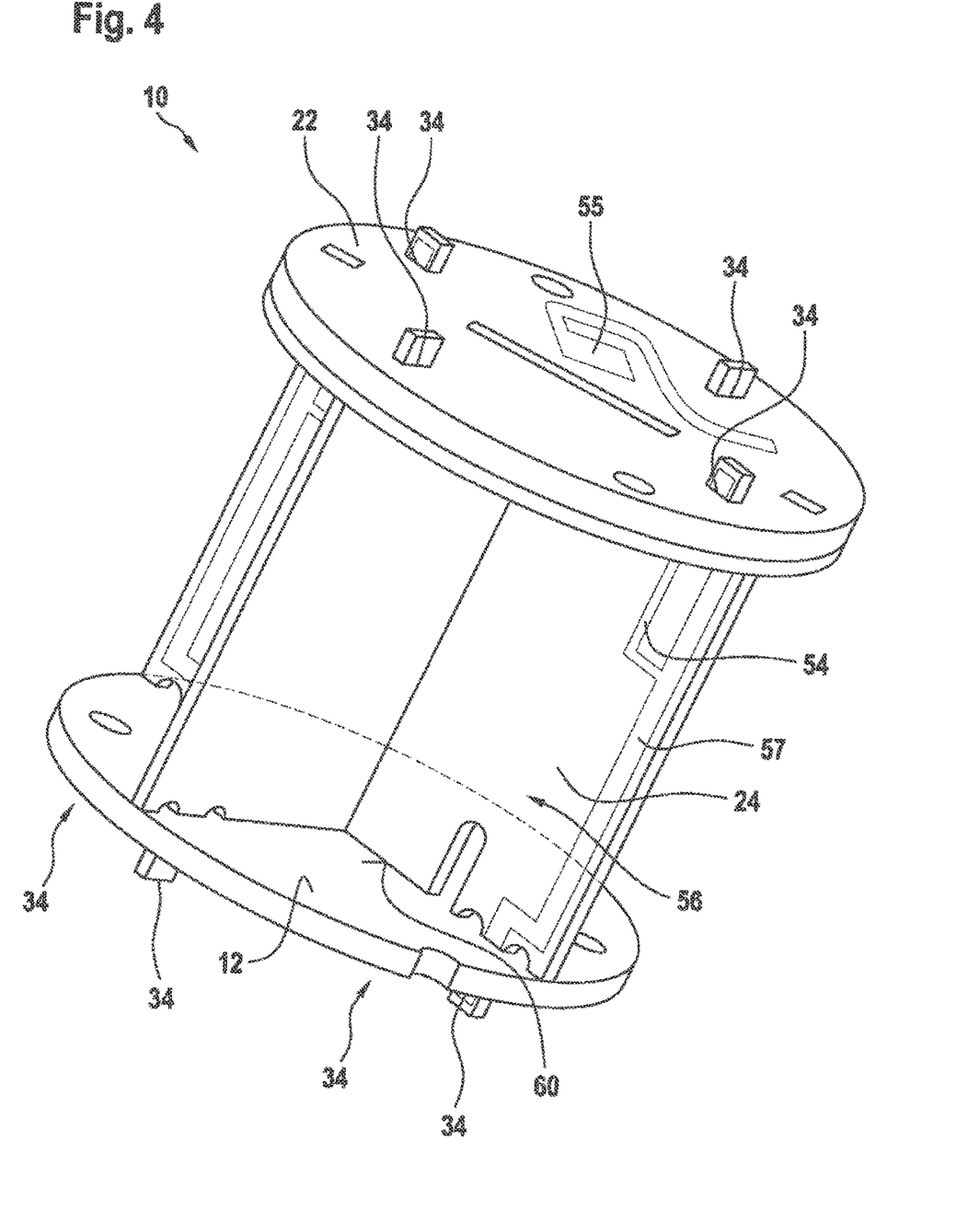
FIG. 4 shows an isometric bottom view of an RFID antenna device with solder joints.

FIG. 4 shows an isometric bottom view of the RFID antenna device 10, wherein the radiator-side and two supply-network-side form-fit extensions 58, 64 are inserted into the corresponding form-fit receptacles 60, 66 and fixed in place with solder joints 34. The solder joints 34 also establish electrical connections between the stubs 54 and the ground terminal 55, the supply lines 57 and the base portions 38 of the radiator portions 16 and the sub-portions 48 of the delay portions 28. For this purpose, the radiator-side and two supply-network-side form-fit extensions 58, 64 extend through the respective circuit boards 40, 44, so that the relevant stub 54 can be soldered to the ground connection 55 or supply line 57 to the base portion 38.

Figure 5:
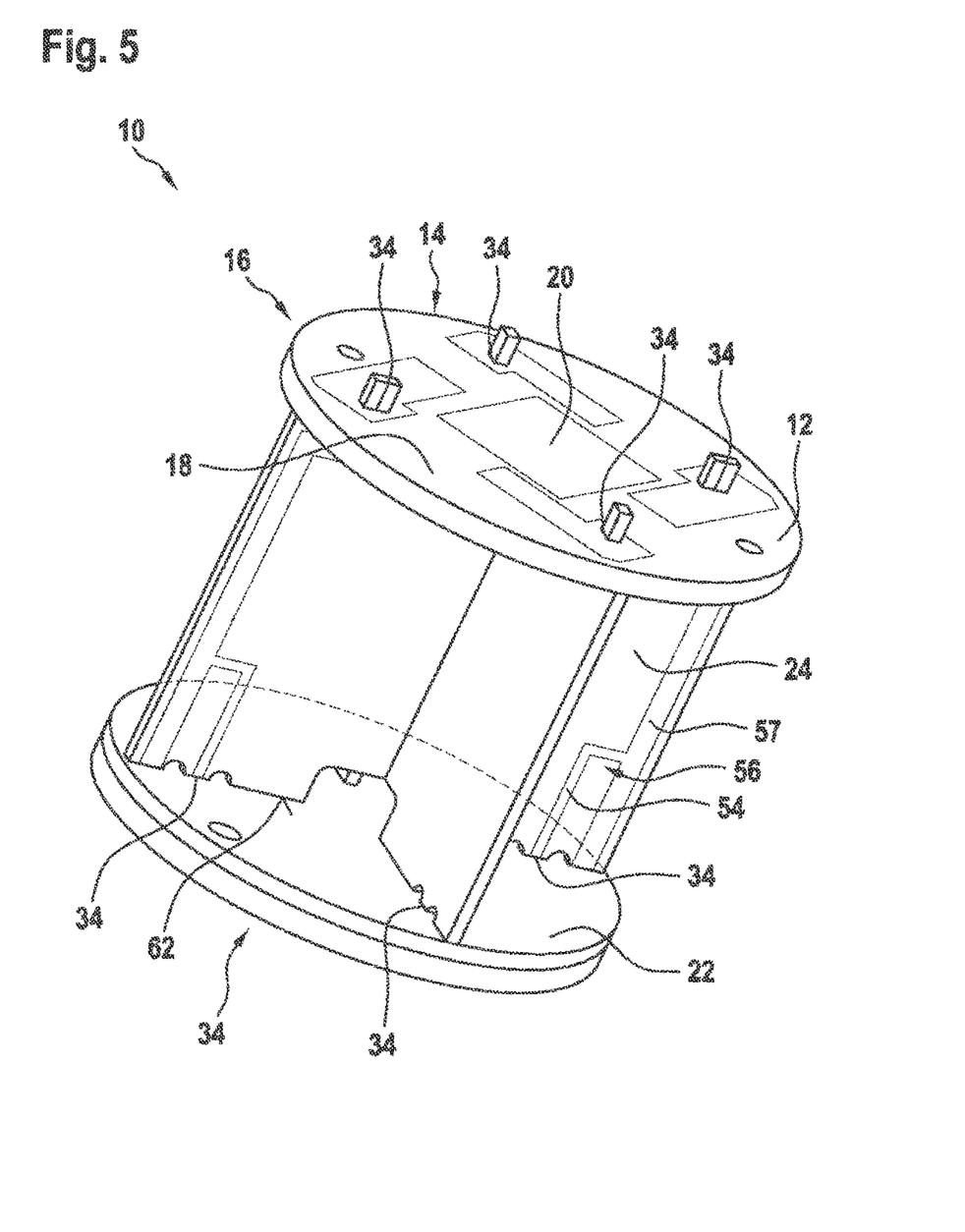
FIG. 5 shows an isometric top view of the RFID antenna device from FIG. 4 with solder joints.

FIG. 5 shows an isometric top view of the RFID antenna device 10 from FIG. 4. The supply-network-side end edge 62 abuts the supply circuit board 44 so that the supply line 57 terminating at the supply-network-side end edge 62 can be butt-soldered to a sub-portion 48.

Figure 6:
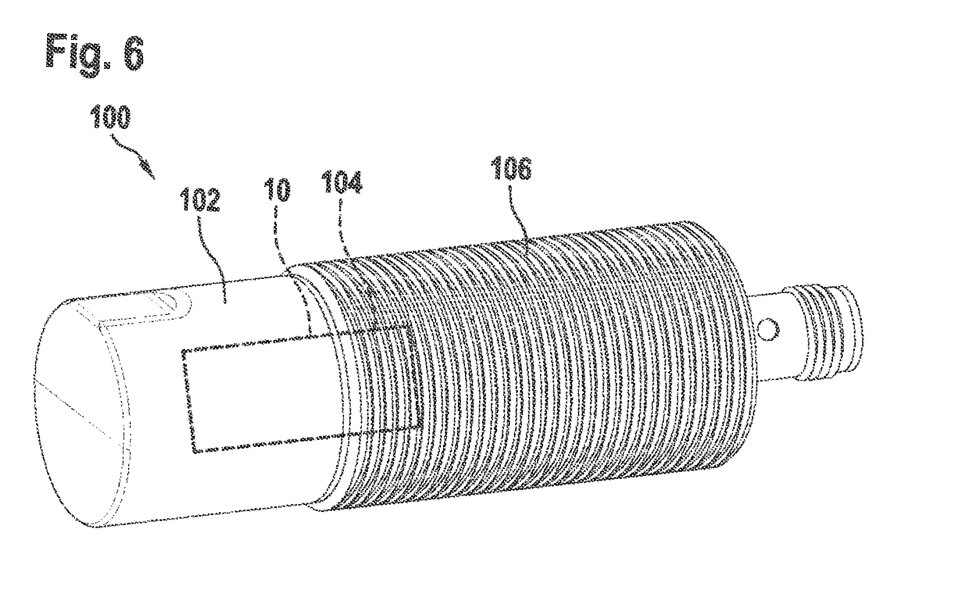
FIG. 6 shows an RFID sensor device with an RFID antenna device.

FIG. 6 shows an RFID sensor device 100 equipped with an RFID antenna device 10 from the preceding figures. The RFID sensor device 100 has a sleeve-shaped housing 102 that includes a receiving cavity 104. The receiving cavity 104 is cylindrical, for example, and matches the RFID antenna device 10 form-fittingly. Further, the receiving cavity 104 may be configured such that an RFID antenna device 10 having a diameter D of $\frac{1}{15}$ of the wavelength λ of the transmitted and/or received circularly polarised electromagnetic radiation can be used. The housing 102 is metallic, for example. The RFID antenna device (10) is inserted through an opening in the receiving cavity 104, which is subsequently closed by a plastic cap. An M30 external thread 106 may be formed on the outside of the housing 102.

The invention claimed is:

1. Radio-frequency identification antenna device (10) for emitting and/or receiving circularly polarised electromagnetic radiation, the antenna device comprising:
    a radiator unit (12) which has a radiator network (14) with multiple at least partially curved radiator portions (16) and at least one auxiliary antenna (20) which is galvanically isolated from the radiator network (14) and which is inductively or capacitively coupled to the radiator network (14),
    a supply network unit (22) having a power division portion (26) with a device port (50) and having at least one delay portion (28) which is electrically conductively connected to the power division portion (26) and is electrically conductively connected to at least one radiator portion (16), wherein the auxiliary antenna (20) is centrally located between the radiator portions (16).

2. The radio-frequency identification antenna device (10) according to claim 1, wherein the radiator portions (16) respectively have a connection end (32) connected to the delay portion (28) and a remote end (30), wherein the connection end (32) is located closer to the auxiliary antenna (20) than the remote end (30).

3. The radio-frequency identification antenna device (10) according to claim 1, wherein the radiator network (14) comprises four radiator portions (16) each connected to a single delay portion (28), wherein the radiator portions (16) are spiral-like starting from the auxiliary antenna (20).

4. The radio-frequency identification RFID antenna device (10) according to claim 1, wherein the auxiliary antenna (20) has sides of equal length.

5. The radio-frequency identification antenna device (10) according to claim 1, wherein the radiator portions (16) have a meandering sub-portion (36) and/or a sub-portion based on a fractal geometry.

6. The radio-frequency identification antenna device (10) according to claim 1, wherein the radiator unit (12) is embodied as a circular radiator circuit board (40) made of a dielectric and has a diameter which is smaller than half the wavelength of the electromagnetic radiation, wherein the radiator network (14) and the auxiliary antenna (20) are arranged as conductor tracks on the radiator circuit board (40).

7. The radio-frequency identification antenna device (10) according to claim 6, wherein a curved sub-portion (18) of the radiator portions (16) is arranged on a circumferential edge of the radiator circuit board (40).

8. The radio-frequency identification antenna device (10) according to claim 1, wherein the supply network unit (22) is configured to apply a wave signal to each delay portion (28), wherein each wave signal of a delay portion (28) has a phase shift of 90° to at least one other of the wave signals of another delay portion (28).

9. The radio-frequency identification antenna device (10) according to claim 1, wherein the power division portion (26) comprises a Wilkinson power divider connected to the at least one delay portion (28).

10. The radio-frequency identification antenna device (10) according to claim 1, wherein the supply network unit (22) is embodied as a circular supply circuit board (44) made of a dielectric, wherein the supply network unit (22) and the delay portion (28) are arranged as conductor tracks on the supply circuit board (44).

11. The radio-frequency identification antenna device (10) according to claim 1, wherein an adapter unit (24) is disposed between the radiator unit (12) and the supply network unit (22) and has at least one compensating portion (52) provided for impedance compensation and at least one supply line (57) provided for electrically conductively connecting the delay portion (28) to the radiator portions (16).

12. The radio-frequency identification antenna device (10) according to claim 11, wherein the compensating portion (52) is a stub (54) connected to a ground connection (55) of the supply network unit (22).

13. The radio-frequency identification antenna device (10) according to claim 11, wherein the adapter unit (24) comprises at least one adapter circuit board (56) on which the compensating portion (52) and/or the supply line (57) are arranged as conductor tracks.

14. The radio-frequency identification antenna device (10) according to claim 13, wherein the adapter unit (24) is constructed from two adapter circuit boards (56) oriented transversely to one another.

15. The radio-frequency identification antenna device (10) according to claim 13, wherein the at least one adapter circuit board (56) is oriented on edge between the radiator unit (12) and the supply unit (22).

16. A radio-frequency identification sensor device (100) comprising:
    a radio-frequency identification antenna device comprising a radiator unit (12) which has a radiator network (14) with multiple at least partially curved radiator portions (16) and at least one auxiliary antenna (20) which is galvanically isolated from the radiator network (14) and which is inductively or capacitively coupled to the radiator network (14), a supply network unit (22) having a power division portion (26) with a device port (50) and having at least one delay portion (28) which is electrically conductively connected to the power division portion (26) and is electrically conductively connected to at least one radiator portion (16), wherein the auxiliary antenna (20) is centrally located between the radiator portions (16); and
    a sleeve-shaped housing (102) having a receiving cavity (104) in which the RFID antenna device (10) is arranged.

17. The radio-frequency identification sensor device (100) according to claim 16, wherein the housing (102) has an external thread (106) and/or the receiving cavity (104) is cylindrical, wherein the receiving cavity has a diameter of $1/15$ of the wavelength of the emitted and/or received circularly polarised electromagnetic radiation.

* * * * *